United States Patent [19]
Beardsley et al.

[11] Patent Number: 6,112,311
[45] Date of Patent: Aug. 29, 2000

[54] BRIDGE FAILOVER SYSTEM

[75] Inventors: Brent Cameron Beardsley; Carl Evan Jones; Forrest Lee Wade, all of Tucson, Ariz.

[73] Assignee: International Business Machines Corporation, Armonk, N.Y.

[21] Appl. No.: 09/026,620

[22] Filed: Feb. 20, 1998

[51] Int. Cl.[7] .................................................. G06F 11/00
[52] U.S. Cl. ..................... 714/3; 710/8; 714/44
[58] Field of Search .................... 714/3, 6, 7–12, 714/16, 2, 15, 25, 44, 47, 48; 710/129, 101, 128, 5, 8, 10, 11, 48, 49, 262; 700/79; 709/229; 395/440; 380/49; 364/187; 712/15, 16

[56] References Cited

U.S. PATENT DOCUMENTS

| | | |
|---|---|---|
| 5,136,498 | 8/1992 | McLaughlin et al. . |
| 5,202,822 | 4/1993 | McLaughlin et al. .................. 364/187 |
| 5,426,774 | 6/1995 | Banerjee et al. . |
| 5,546,535 | 8/1996 | Stallmo et al. .............................. 714/9 |
| 5,548,649 | 8/1996 | Jacobson ................................... 380/49 |
| 5,586,291 | 12/1996 | Lasker et al. ........................... 395/440 |
| 5,617,530 | 4/1997 | Stallmo et al. .............................. 714/6 |
| 5,632,021 | 5/1997 | Jennings et al. ........................ 710/129 |
| 5,682,509 | 10/1997 | Kabenjian . |
| 5,761,462 | 6/1998 | Neal et al. ............................... 710/129 |
| 5,764,924 | 6/1998 | Hong ........................................ 710/101 |
| 5,790,775 | 8/1998 | Marks et al. ............................... 714/9 |
| 5,854,908 | 12/1998 | Ogilvie et al. .......................... 710/128 |
| 5,878,204 | 3/1999 | Kobayashi et al. ......................... 714/9 |
| 5,937,174 | 8/1999 | Weber ...................................... 710/129 |
| 5,938,732 | 8/1999 | Lim et al. ................................ 709/229 |
| 5,944,838 | 8/1999 | Jantz ........................................... 714/6 |
| 5,991,843 | 11/1999 | Porterfield et al. ..................... 710/112 |
| 6,006,342 | 12/1999 | Beardsley et al. ........................... 714/5 |

OTHER PUBLICATIONS

PCI Local Bus "PCI to PCI Bridge Architecture Specification", Revision 1.0, Apr. 5, 1994.
PCI Local Bus "PCI Local Bus Specification", Production Version, Revision 2.0, Apr. 30, 1993.

*Primary Examiner*—Joseph E. Palys
*Assistant Examiner*—Rijue Mai
*Attorney, Agent, or Firm*—David W. Victor; Konrad Raynes & Victor LLP

[57] ABSTRACT

Disclosed is a system for communication among a device, a first processor, and a second processor. One of a first data path and second data path is configured. The first data path comprises a bus, such as a local PCI bus, a first remote bridge, and a first local bridge. The bridges may be comprised of PCI to PCI bridges. After configuring the first data path, the device communicates to the first processor by communicating data through the bus to the first remote bridge. The first remote bridge transmits the data to the first local bridge and the first local bridge transmits the data to the first processor. The second data path comprises the bus, a second remote bridge, and a second local bridge. After configuring the second data path, the device communicates to the second processor by communicating data through the bus to the second remote bridge. The second remote bridge transmits the data to the second local bridge and the second local bridge transmits the data to the second processor.

31 Claims, 6 Drawing Sheets

BRIDGE FAILOVER SYSTEM

CROSS-REFERENCE TO RELATED APPLICATIONS

This application is related to the co-pending and commonly-assigned U.S. patent application, Ser. No. 09/026,622, filed on same date herewith, by Brent C. Beardsley, Matt Kalos, and Ronald R. Knowlden, entitled "Failover System for a Multi-Processor Storage Controller", which application is incorporated herein by reference in its entirety.

BACKGROUND OF THE INVENTION

1. Field of the Invention

The present invention relates to a system for using bridges in a failover system and, in preferred embodiments, for allowing two or more processors to act as bus masters in a PCI to PCI bridge failover system.

2. Description of the Related Art

The Peripheral Component Interconnect (PCI) bus is a high-performance expansion bus architecture that was designed to replace the traditional ISA (Industry Standard Architecture) bus. A processor bus master communicates with the PCI local bus and devices connected thereto via a PCI Bridge. This bridge provides a low latency path through which the processor may directly access PCI devices mapped anywhere in the memory or I/O address space. The bridge may optionally include such functions as data buffering/posting and PCI central functions such as arbitration.

The PCI specification provides for totally software driven initialization and configuration via a separate configuration address space. During the configuration, the PCI bus master processor can read or write to the configuration space of each device connected to the local PCI bus in order to map the device to the memory address space and assign address spaces to the connected devices. The architecture and operation of the PCI local bus is described in "PCI Local Bus Specification," Revisions 2.0 (April, 1993) and Revision 2.1s, published by the PCI Special Interest Group, 5200 Elam Young Parkway, Hillsboro, Oregon, which specifications are incorporated herein by reference in their entirety.

A PCI to PCI bridge provides a connection path between two independent PCI local busses. The primary function of the bridge is to allow transactions between a master on one PCI bus and a target device on another PCI bus. The PCI Special Interest Group has published a specification on the architecture of a PCI to PCI bridge in "PCI to PCI Bridge Architecture Specification," Revision 1.0 (April 10, 1994), which specification is incorporated herein by reference in its entirety. This specification defines the following terms and definitions:

- initiating bus—the master of a transaction that crosses a PCI to PCI bridge is said to reside on the initiating bus.
- target bus—the target of a transaction that crosses a PCI to PCI bridge is said to reside on the target bus.
- primary interface—the PCI interface of the PCI to PCI bridge that is connected to the PCI bus closest to the CPU is referred to as the primary PCI interface.
- secondary interface—the PCI interface of the PCI to PCI bridge that is connected to the PCI bus farthest from the CPU is referred to as the secondary PCI interface.
- downstream—transactions that are forwarded from the primary interface to the secondary interface of a PCI to PCI bridge are said to be flowing downstream.
- upstream—transactions forwarded from the secondary interface to the primary interface of a PCI to PCI bridge are said to be flowing upstream.

Thus, a PCI to PCI bridge has two PCI interfaces, the primary and secondary. Each interface is capable of either master or target operation. The bridge functions as a target on the initiating bus on behalf of the target that actually resides on the target bus. Likewise, the bridge functions as a master on the target bus on behalf of the master that actually resides on the initiating bus.

A master processor configures the PCI bridges, PCI local busses, and devices connected thereto and maps such devices to the memory address space using a combination of type 0 and type 1 configuration operation commands. Type 0 configuration commands are not forwarded across PCI to PCI bridges. Type 0 configuration commands are used to configure PCI to PCI bridges or other PCI devices that are connected to the PCI bus on which the type 0 configuration command is generated. Type 1 configuration commands can be forwarded by PCI to PCI bridges to any level within the PCI bus hierarchy, such as further busses and bridges. A PCI to PCI bridge that receives a type 1 configuration command converts the command to a type 0 command to configure devices connected to the bridge's secondary interface if the bus number in the type 1 command matches the bus number of the bus connected to the bridge's secondary interface, i.e., the secondary bus number. The bridge will forward a type 1 configuration command down its secondary interface to another PCI bridge if the address specified in the type 1 command is between the bus number of the bus attached to the secondary interface of the bridge and a subordinate bus number of the bridge. The subordinate bus number is the number of the highest numbered PCI bus that is behind or subordinate to a bridge.

During system initialization, the BIOS generates the secondary bus number, the primary bus number, which is the bus number of the bus that the primary interface of the bridge is connected to, and the subordinate bus number and records such information within PCI bridge registers. The BIOS that finds a PCI to PCI bridge further needs to map all devices that reside below the bridge on the primary interface to memory address space.

One limitation in the prior art is that a PCI subsystem, comprised of a hierarchical arrangement of local PCI busses, PCI to PCI bridges, and other devices, cannot be configured separately by two different processor bus masters as part of a failover system. For instance, primary and secondary processors may be connected to a PCI subsystem and each capable of functioning as a bus master. During initialization, the bridge for the primary processor will assign bus numbers to all the busses in the subsystem and assign address space to all devices and bridges within the subsystem. If the primary processor failed, then in a failback system, the secondary processor would attempt to assume control of the subsystem. However, limitations in the PCI prior art would prevent the secondary processor from successfully taking the place of the primary processor. In the current PCI prior art, the secondary processor would reconfigure the PCI bridges, busses and other devices connected to the system with bus numbers and addresses that conflict with the numbers and addresses assigned by the failed primary processor. The conflicting configurations assigned by the two bus masters prevent a dual master processor design in a PCI to PCI bridge failover subsystem.

SUMMARY OF THE INVENTION

To address the shortcomings in the prior art described above, preferred embodiments of the present invention provide a system for communication among a device, a first processor, and a second processor. One of a first data path and second data path is configured. The first data path comprises a bus, a first remote bridge, and a first local bridge. After configuring the first data path, the device communicates to the first processor by communicating data through the local bus to the first remote bridge. The first remote bridge transmits the data to the first local bridge and the first local bridge transmits the data to the first processor. The second data path comprises the bus, a second remote bridge, and a second local bridge. After configuring the second data path, the device communicates to the second processor by communicating data through the bus to the second remote bridge. The second remote bridge transmits the data to the second local bridge and the second local bridge transmits the data to the second processor.

In further embodiments, the first processor configures the first local bridge as a device. The second processor configures the second local bridge as a device. The first processor then issues a configuration signal to configure the first remote bridge. Likewise, the second processor issues a configuration signal to configure the second remote bridge. The first processor further issues configuration signals to configure the bus and device attached thereto.

In still further embodiments, the second processor can reconfigure the first and second data paths to configure the second local bridge, second remote bridge, and the device to direct data toward the second processor.

In additional embodiments, a nonvolatile storage unit is included to backup a copy of data being transmitted from the device in case the processor to which the data is directed fails.

It is an object of preferred embodiments of the present invention to allow two processors to operate as bus masters of a bridge subsystem, wherein each processor can configure the bridge subsystem and devices connected thereto to control the data path between the devices and the processors.

It is still a further object of preferred embodiments of the present invention to provide a failover system to redirect data toward an operating data path should one of the processors or a component within the bridge subsystem fail.

It is yet another object to provide a non-volatile backup storage to backup a copy of data being written from the processor to an additional device in the event that the processor fails to successfully transmit the data to the additional device.

BRIEF DESCRIPTION OF THE FIGURES

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Architecture of the Bridge Failover System

Figure 1:
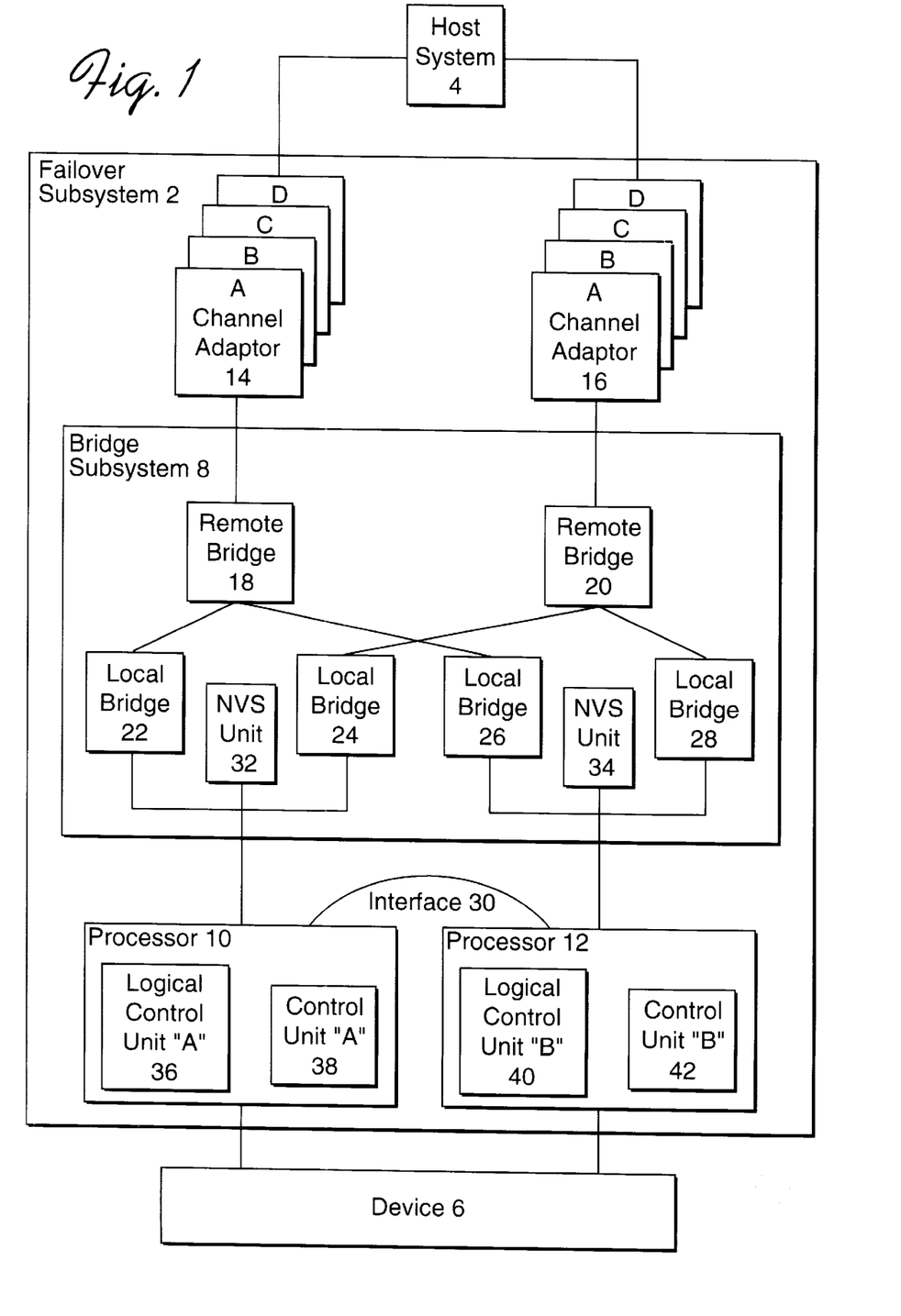
FIG. 1 illustrates a preferred embodiment of the hardware configuration of the bridge and failover subsystems in accordance with the present invention.

FIG. 1 illustrates a failover subsystem 2 that provides data communication paths between a host system 4 and a device 6. In preferred embodiments, the failover subsystem 2 includes a bridge subsystem 8 that allows either processor 10, 12 to communicate with and configure channel adaptors 14, 16. The bridge subsystem 8 further allows either processor 10, 12 to operate as a master of the bridge subsystem 8. In alternative embodiments, the bridge subsystem 8 could be used to allow processors 10, 12 to communicate with devices other than channel adaptors 14, 16 including any device that typically communicates over a bus to a processor. In the embodiment of FIG. 1, each set of channel adaptors 14, 16 is comprised of four channel adaptor cards A, B, C, D that are each connected via a slot to a remote bridge 18, 20. Each channel adaptor card A, B, C, D provides a connection to one or more host systems.

The device 6 may be a direct access storage device (DASD) or other subsystem. Related co-pending and commonly assigned U.S. Patent Application entitled "Failover System for a Multi-Processor Storage Controller," which is incorporated by reference in its entirety above, describes the use of a failover subsystem providing communication paths between a host system and a string of DASDs.

As illustrated in FIG. 1, the bridge subsystem 8 includes two remote bridges 18, 20. Remote bridge 18 is connected to local bridges 22, 26 and remote bridge 20 is connected to local bridges 24, 28. The failover subsystem 2 is comprised of two sides. One side includes channel adaptors 14, remote bridge 18, local bridges 22, 24, and processor 10. The other side similarly includes channel adaptors 16, remote bridge 20, local bridges 26, 28, and processor 12. These sides allow each set of channel adaptors 14, 16 to communicate with each processor 10, 12. Channel adaptors 14 communicate with processor 10 via remote bridge 18 and local bridge 22 and with processor 12 via remote bridge 18 and local bridge 26. Channel adaptors 16 communicate with processor 10 via remote bridge 20 and local bridge 24 and with processor 12 via remote bridge 20 and local bridge 28. The host system 4 shown in FIG. 1 is a dual host system known in the art. For instance, if the host system 4 is connected to channel adaptor 14 A and channel adaptor 16 A, then the host system 4 may select from either of the two channel adaptors 14 A, 16 A to communicate with the processors 10, 12 and device 6 below.

The processors 10 and 12 may communicate via an interface 30, which may be an $IC^2$ interface, ethernet or any other suitable interface known in the art or another bridge subsystem 8. The processors 10, 12 can detect a failure of the other processor via the interface 30.

A non-volatile storage (NVS) unit 32, 34 is linked to each path between each pair of local bridges 22, 24 and 26, 28. The local bridges 22, 24 and NVS unit 32 and local bridges 26, 28 and NVS unit 34 may be linked by a local bus or other suitable device. The NVS unit is a memory array supported by a battery backup system as known in the art. The NVS units 32, 34 store back-up copies of modified data in the event of a hardware failure within the processors 10, 12 while the processors 10, 12 are transmitting data to the device 6. In preferred embodiments, the NVS units 32, 34 may backup data from the other side. For instance, when remote bridge 18 is communicating data to the local bridge 22 for transmittal to the processor 10, the remote bridge 18 would transmit a copy of the data to the NVS unit 34 via local bridge 26. In this way, NVS unit 34 maintains a copy of all data being written to processor 10. Likewise, NVS unit 32 maintains a copy of all data remote bridge 20 is writing to processor 12. Thus, if one of the processors 10, 12 fails to transmit all the data to the device 6 and loses such data, a backup copy of the data that has not been transmitted to the device 6 is maintained in an NVS unit 32, 34.

In preferred embodiments, local busses could be used to interconnect the bridge components 18, 20, 22, 24, 26, 28 within the bridge subsystem 8 to any downstream or upstream device, thereby providing primary and secondary interfaces, wherein any bridge component or device linked thereto may be the initiating or targeting bus. For instance, a local bus could interconnect remote bridge 18 with local bridges 22, 26, a local bus could interconnect local bridges 22, 24, NVS unit 32, and processor 10, and a local bus could interconnect channel adaptors 14 with remote bridge 18. Similarly, a local bus could interconnect remote bridge 20 with local bridges 24, 28, a local bus could interconnect local bridges 26, 28, NVS unit 34, and processor 12, and a local bus could interconnect channel adaptors 16 with remote bridge 20. In yet further embodiments, any number of combinations of local busses could provide interconnection between the components of the bridge subsystem 8, processors 10, 12, and channel adaptors 14, 16.

Processor 10 may further include a logical control unit "A" 36 and a control unit "A" 38 and processor 12 may further include a logical control unit "B" 40 and a control unit "B" 42.

Figure 2:
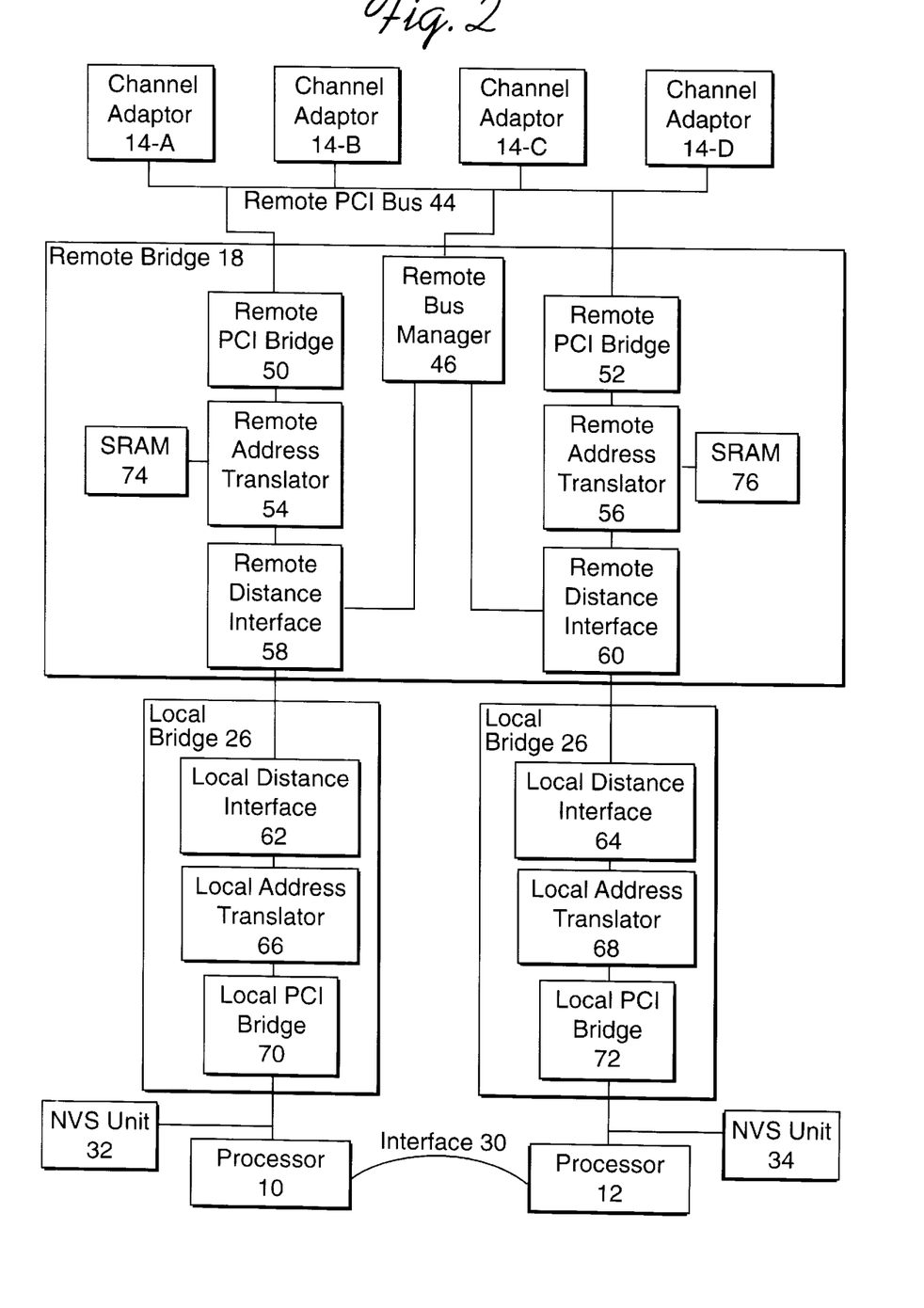
FIG. 2 illustrates a preferred embodiment of the hardware configuration of a portion of the bridge subsystem illustrated in FIG. 1.

FIG. 2 provides further detail of one-half of the bridge subsystem 8, including remote bridge 18 and local bridges 22, 26, that allows the processors 10, 12 to communicate with channel adaptors 14. The same configuration would apply to the other half of the bridge 8 and failover 2 subsystems, including channel adaptors 16, remote bridge 20, local bridges 24, 28, and processors 10, 12.

Remote bridge 18 includes a remote PCI bus 44. A remote bus manager 46 manages data and signals presented on the remote PCI bus 44. The remote bus manager 46 performs arbitration functions for the bus 44 and maps data and control signals presented by the channel adaptors 14, 16 to an address in the PCI address space. The remote bus manager 46 may be comprised of a hardwired control unit or a microprocessor. Remote bridge 18 includes two sides, each side having a remote PCI bridge 50, 52, a remote address translator 54, 56, a remote distance interface 58, 60, and a static random access memory (SRAM) 74, 76 or other suitable memory device known in the art. Remote PCI bridge 50, remote address translator 54 and remote distance interface 56 provide communication between channel adaptors 14 and local bridge 22. Remote PCI bridge 52, remote address translator 56 and remote distance interface 60 provide communication between channel adaptors 14 and local bridge 26.

The channel adaptors 14 A, B, C, D communicate with either remote PCI bridge 50, 52 via the remote PCI bus 44. Remote PCI bridges 50, 52 may be comprised of PCI bridge chips known in the art or any other suitable type of bridge chip which is capable of performing the functions discussed herein. The remote 58, 60 and local 62, 64 distance interfaces include controls and buffers known in the bridge art to control transactions between the remote bridge 18 and the local bridges 22, 26 and provide for long distance communication therebetween.

Each local bridge 22, 26 includes, respectively, a local distance interface 62, 64, a local address translator 66, 68, and a local PCI bridge 70, 72. The remote 54, 56 and local 66, 68 address translators include circuitry known in the art to map a received address to another address space. Remote address translators 54, 56 may perform address translation by accessing an address translation map maintained in SRAM 74, 76, respectively. For instance, remote address translators 54, 56 would map an address provided by channel adaptors 14 to the address space of the local PCI bridges 70, 72, respectively. Local address translators 66, 68 would map an address from the local PCI bridges 70, 72 to the address space of the remote PCI bridges 50, 52, respectively. The remote 54, 56 and local 70, 72 address translators also include data buffer control circuitry known in the art to transmit data and address information. For instance, after local address translator 66, 68 translates an address received from the local PCI bridge 70, 72 to the remote PCI bridge 50, 52 address space, this translated address is transmitted to the remote address translator 54, 56 via the local 62, 64 and remote 58, 60 distance interfaces. In such case, the remote address translator 54, 56 may buffer and transmit this received address to the remote PCI bridge 50, 52 without performing further translation. Likewise, after remote address translator 54, 56 translates an address received from the remote PCI bridge 50, 52 to the address space of the local PCI bridge 70, 72, respectively, this translated address is transmitted to the local address translator 70, 72 via the remote 58, 60 and local 62, 64 distance interfaces. In such case, the local address translator 70, 72 may buffer and transmit this received address to the local PCI bridge 70, 72 without performing further translation.

The components and configuration of remote bridge 20 and local bridges 24, 28 that provide communication paths between channel adaptors 16 and processors 10, 12 are identical to that of the remote bridge 18 and local bridges 22, 26 discussed above.

Initialization and Configuration

Preferred embodiments of the present invention provide a system for configuring the components within the failover subsystem 2 and bridge subsystem 8. Upon initialization, a BIOS processor (not shown) would cause processor 10 to issue a type 0 configuration command to configure the local PCI bridges within local bridges 22, 24, e.g., local PCI bridge 70, as adaptors. Thus, the processor 10 views the local PCI bridges within local bridges 22, 24 as adaptors with no further downstream components. Similarly, the BIOS would have the processor 12 issue a type 0 configuration command to configure the local PCI bridges within local bridges 26, 28, e.g., local PCI bridge 72, as adaptors with no further downstream components. The purpose of disguising the local PCI bridges within local bridges 22, 24, 26, 28 is to prevent the processor 10 from being the starting point of the configuration map and address space for the devices downstream from the local PCI bridges. During the BIOS operation, the processors 10, 12 could also configure the attached NVS units 32, 34, respectively. After this BIOS configuration, the processors 10, 12 execute a device driver program (not shown), which is part of the system code, to configure the remainder of the components in the failover 2 and bridge 8 subsystems.

With reference to FIG. 2, under control of the device driver program, the processor 10 performs initialization operations, such as assign PCI bus numbers, allocate address spaces to the devices downstream from local PCI bridge 70, and assign IRQ numbers. The processor 10, under control of the device driver program will also issue memory operation commands to directly configure devices downstream from the local PCI bridge 70, such as remote PCI bridge 50. Processor 12 would likewise execute the device driver program to issue memory operation commands to configure the remote PCI bridge 52. One of the processors 10, 12, such as processor 10, would then signal remote PCI bridge 50 to configure remote PCI bus 44 and the channel adaptors 14A, B, C, D. In preferred embodiments, the remote PCI bridge 50 could issue type 0 configuration commands to configure the remote PCI bus 44 and channel adaptors 14A, B, C, D. Alternatively, if the channel adaptors 14A, B, C, D had their own internal PCI busses, the remote PCI bridge 50 could issue type 1 configuration commands to configure the channel adaptors 14A, B, C, D. In alternative configuration patterns, processor 12 could configure the remote PCI bus 44 and channel adaptors 14A, B, C, D through remote PCI bridge 52. Each processor 10, 12 would then issue commands throughout the bridge subsystem 8 to configure a portion of the remote bus manager 46. The remote bus manager 46 provides shared logic to both sides. Remote bus manager 46 performs bus arbitration and other bus management operations. Processor 10 would then configure the local address translator 70 and remote address translator 54 and processor 12 would configure the local address translator 72 and remote address translators 56 for mapping between devices in the bridge subsystem 8. Each processor 10, 12 would then initialize the SRAMs 74, 76, respectively, with address mapping tables.

In alternative embodiments, one processor 10, 12 could configure the entire bridge subsystem 8. For instance, after each processor 10, 12 configures the respective local PCI bridges, e.g., local PCI bridges 70, 72, one processor, such as processor 10 could execute the device driver program to configure all components throughout the bridge subsystem 8. For instance, processor 10 could configure the remote PCI bridge 50, and then issue configuration commands through the remote PCI bus 44 to configure remote PCI bridge 52 and further downstream components.

Processors 10, 12 would similarly configure the other half of the bridge subsystem 8, including local remote bridge 20, channel adaptors 16, and local bridges 24 and 28 in the manner described with respect to remote bridge 18 and local bridges 22, 26.

As a result of configuration, a portion of the device 6 is associated with and managed by logical control unit "A" 36 in processor 10 and the remaining portion is associated with and managed by logical control unit "B" 40 in processor 12. For instance, if the device 6 is comprised of a string of DASDs, then half of the DASDs may be managed and associated with logical control unit "A" 36 and the other half of DASDs may be managed and associated with logical control unit "B 40.

Figure 3:
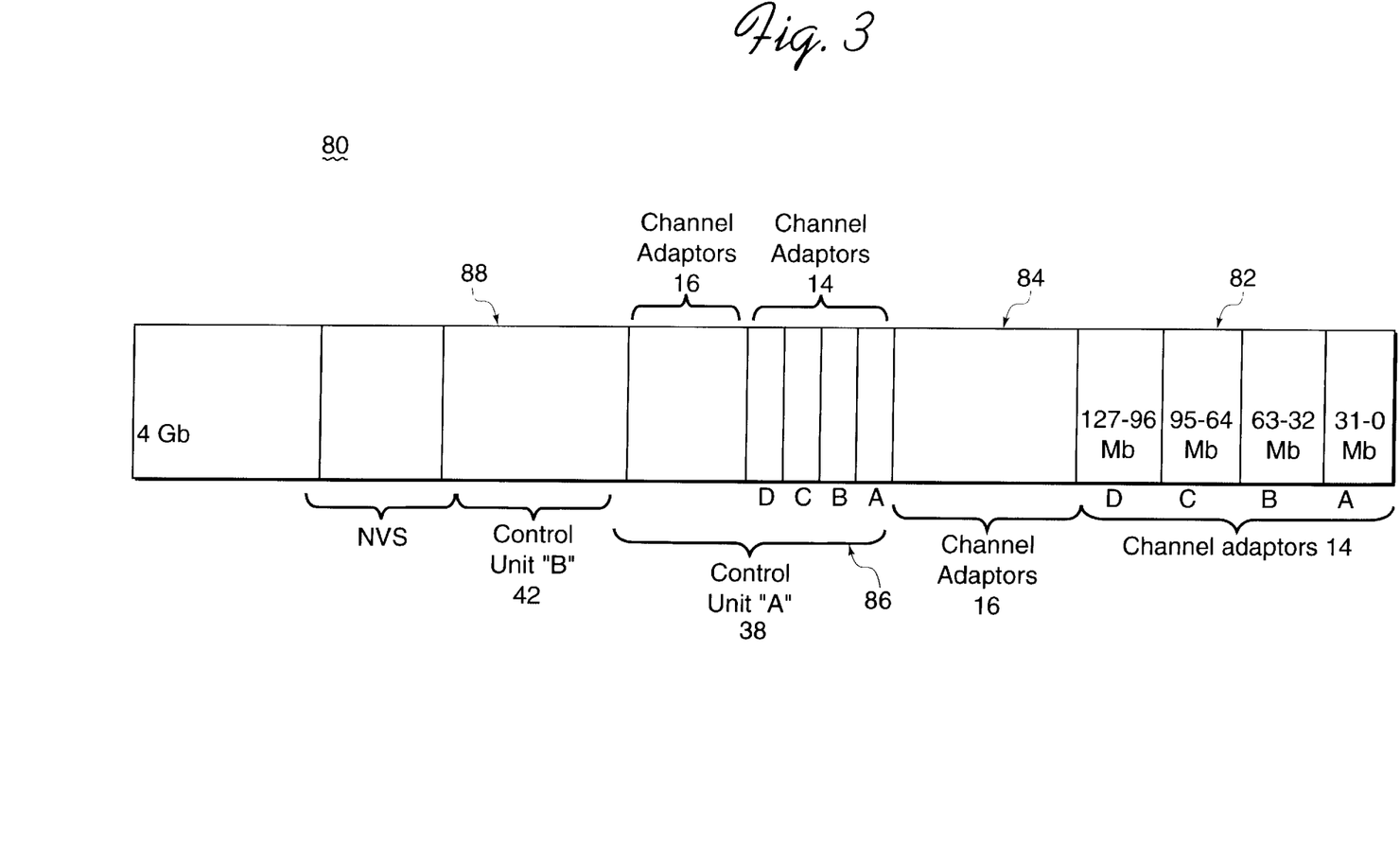
FIG. 3 is an illustration of an address space for the components in the bridge subsystem.

As a result of configuration, addresses for the channel adaptors 14A, B, C, D and channel adaptors 16A, B, C, D are associated with control unit "A" 38 and/or control unit "B" 42. FIG. 3 illustrates a 4 gigabyte (Gb) configured address space 80 for the bridge subsystem 8. Channel adaptors 14A, B, C, D are assigned to the first 128 megabyte (Mb) 82 of address space. For instance, channel adaptor 14A occupies the first 32 Mb of the address space, address spaces 0–31 MB, channel adaptor 14B occupies the 32–63 Mb of the address space, channel adaptor 14C occupies the 64–95 Mb of the address space, and channel adaptor 14D occupies the 96–127 Mb of the address space. Channel adaptors 16A, B, C, D would be assigned to the next 128 Mb 84 of the address space, addresses 128–243. In this way, if a processor 10, 12 wants to communicate with one of the channel adaptors, it uses an address in the address space designated for that channel adaptor.

Partition 86 of the address space 80 is dedicated to control unit "A" 38 and partition 88 is dedicated to control unit "B" 42. The partitions 86, 88 for the control units include subdivisions for each channel adaptor. The partition 86 shows the subdivision of address space for channel adaptors 14A, B, C, D. A partition for channel adaptors 16 would have similar subdivisions. Likewise, a partition 88 for control unit "B" 42 would be assigned address space for each channel adaptor 14, 16. A particular channel adaptor 14, 16 would communicate with control unit "A" by selecting an address in the subdivision for that channel adaptor in the partition. For instance, channel adaptor 14A would communicate with control unit "A" 38 using address spaces in the 14A subdivision of partition 86.

Furthermore, during configuration, address space is designated for controls, such as determining how to route a copy of data being routed to a processor 10, 12 to an NVS unit 32, 34. Thus, when data is mapped to an address for a control unit 38, 42, the remote bridge further maps a copy of the data to an address of a particular NVS unit 32, 34 to maintain a backup copy of the data being copied by the processor 10, 12 to the device 6.

The address space 80 would further include partitions for communication between processors 10, 12. With reference to FIG. 2, if processor 10 presents an address in the address space partition for processor-to-processor communication, then the local address translator 66 maps the address to the remote PCI bridge 50 space, which then maps the address to remote PCI bridge 52 via the remote PCI bus 44, which then transmits the address to remote address translator 56 to map to the local PCI bridge 72. The local PCI bridge 72 would then map the address to processor 12's address space.

The remote bus manager 46 carries out mapping for the channel adaptors 14, 16. When one of the channel adaptors 14, 16 wants to communicate with the device 6, it asserts its address on the remote PCI bus 44. The remote bus manager 46 determines which channel adaptor is communicating on the bus by the slot position of the communicating channel adaptor. The remote bus manager 46 then maps the data or messages from the channel adaptor to the control unit 38, 42 assigned to that channel adaptor during configuration. As a result of the configuration, the remote bus manager 46 will map data or control signals from a particular channel adaptor to a predetermined control unit 38, 42 using the addresses set in the address space 80.

Both dynamic and "ignorant" channel adaptors 14 can interface with the bridge subsystem 8. An "ignorant" channel adaptor does not have any information on the make-up of the bridge subsystem 8. The "ignorant" adaptor functions as if it is interacting with a generic PCI bus. During configuration, one of the processors 10, 12 configures and initializes the "ignorant" adaptor registers to provide the adaptor with the address of the configuring processor 10, 12. The configuring processor 10, 12 would further configure the adaptor to direct communication toward the particular processor. In preferred embodiments, each adaptor card 14A, B, C, D has two ports. Each port is configured to a different processor 10, 12. The configuring processor 10, 12 would cause the adaptor to communicate via one of the ports. The "ignorant" adaptors, thus, have no ability to select a processor 10, 12 for communication. Instead, the "ignorant" adaptors communication path is pre-determined by the configuring processor 10, 12. A dynamic channel adaptor, on the other hand, has a dedicated processor and knowledge of the components of the bridge subsystem 8. The dynamic adaptors can select a processor 10, 12 for communication depending on the logical unit being addressed. During configuration, the processors 10, 12 configure the dynamic adaptors with information on the devices and logical units each specific processor controls. This information allows the dynamic adaptor to address a particular processor 10, 12 depending on the device the adaptor wants to address. For instance, if the dynamic adaptor wants to address logical control unit "A" 36, then the dynamic adaptor will direct communication to processor 10 via the appropriate port. Likewise, the dynamic adaptor will address processor 12 to communicate with logical control unit "B" 40.

If a component within the data paths between channel adaptors 14, 16 and processor 10 fails, then processors 10, 12 could fence the channel adaptors 14A, B, C, D by configuring the channel adaptors 14A, B, C, D to direct communication toward functioning data paths. To fence an "ignorant adaptor," the processors 10, 12 would configure the adaptor to direct all communication toward a particular path. To fence a dynamic adaptor, the processors 10, 12 could change the device table in the adaptor to provide the dynamic adaptor with all functioning data paths. The dynamic adaptor could then select from the functioning data paths. The preferred embodiments provide for non-stop operation because the data path can be changed and failed components fenced-off without having to take the failover 2 and bridge 8 systems off-line or reboot the systems. Alternatively, if the primary processor fails, such as processor 10, then processor 12 could reconfigure the failover subsystem 2 and bridge subsystem 8 therein to redirect communication from the host system 4 to the device 6 via processor 12. However, reconfiguration of the entire failover system 2 is not necessary to alter the communication data paths.

In real time, processors 10, 12, host system 4, and/or channel adaptors 14, 16 are transmitting signals throughout the components in the bridge subsystem 8 to determine if all components are functioning properly. In the case of dynamic channel adaptors, the dynamic channel adaptors can detect failures and notify processors 10, 12 of such failure. In such case, the processor 10, 12 would determine how to failover to a functioning data path and communicate such functioning data paths to the dynamic adaptor. The dynamic channel adaptor could then select a functioning data path to use depending on the device to be communicated with. In the case of "ignorant" adaptors, the processors 10, 12 would detect any failures and reconfigure the "ignorant" adaptors. The "ignorant adaptors" can be reconfigured by writing to registers in the "ignorant" adaptors to cause the "ignorant" adaptors to direct communication toward a processor selected communication path.

If processor 10 has failed during initialization or at any other time, then processor 12 may reconfigure the bridge 8 subsystem to direct communication from the channel adaptors 14, 16 to processor 12. Alternatively, processor 12, operating under control of the BIOS program, could reconfigure the bridge subsystem 8. To reconfigure, the processor 12 would first configure the local PCI bridges in local bridges 26, 28 as adaptors with a type 0 configuration command. After this step, processor 12 would execute the device driver program to assign bus numbers, assign addresses in the memory space, and set IRQs within the bridge subsystem 8 to direct communication from the channel adaptors 14, 16 to processor 12. Processor 12 would then execute the device driver program to configure the remaining components in the bridge subsystem 8.

In preferred embodiments, processor 12 may fence off processor 10 by writing to registers in the attached devices, e.g., channel adaptors 14, 16, to cause the channel adaptors 14, 16 to set a mask bit in the addresses they generate to direct communication toward processor 12.

Those skilled in the art will recognize that the exemplary environment illustrated in FIGS. 1, 2, and 3 is not intended to limit the present invention. Indeed, those skilled in the art will recognize that other alternative hardware environments and programs may be used without departing from the scope of the present invention.

Flowcharts for Configuration of Bridge and Failover Takeover

Figure 4:
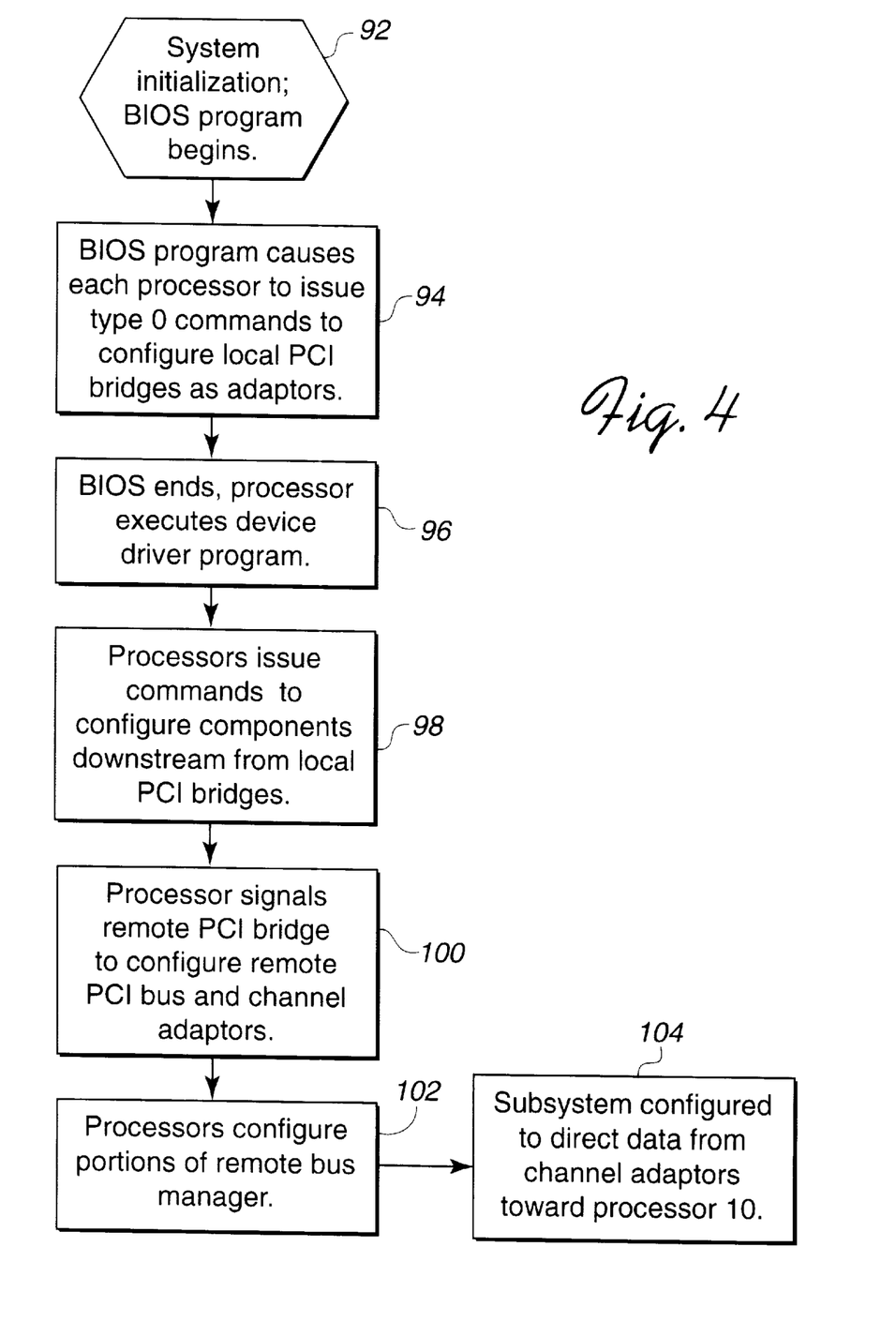
FIG. 4 is a flowchart that illustrates general logic used to configure the bridge and failover subsystems in accordance with a preferred embodiment of the present invention.
Figure 5:
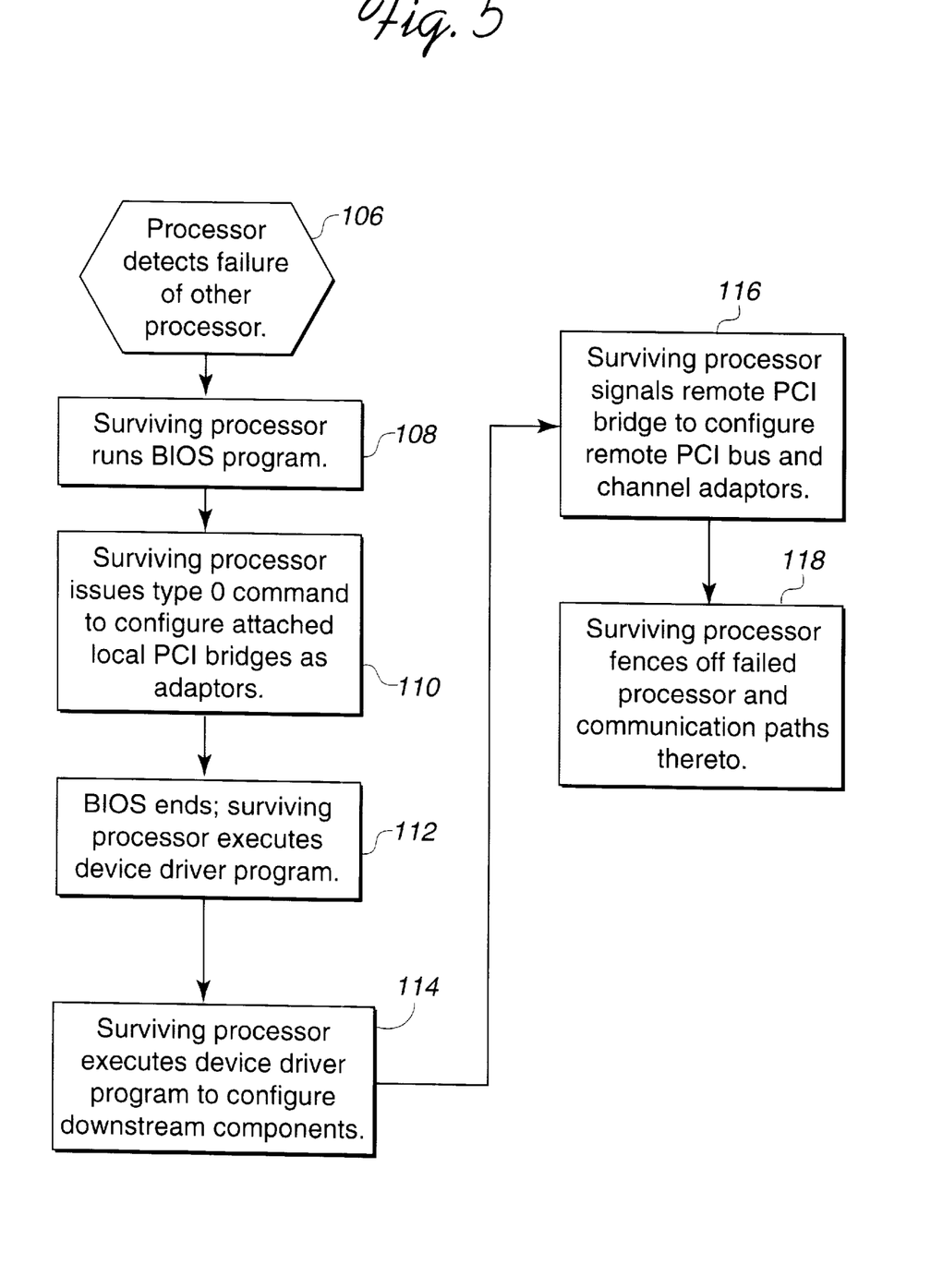
FIG. 5 is a flowchart that illustrates general logic used to reconfigure the bridge and failover subsystems upon occurrence of one of the processors failing in accordance with a preferred embodiment of the present invention.
Figure 6:
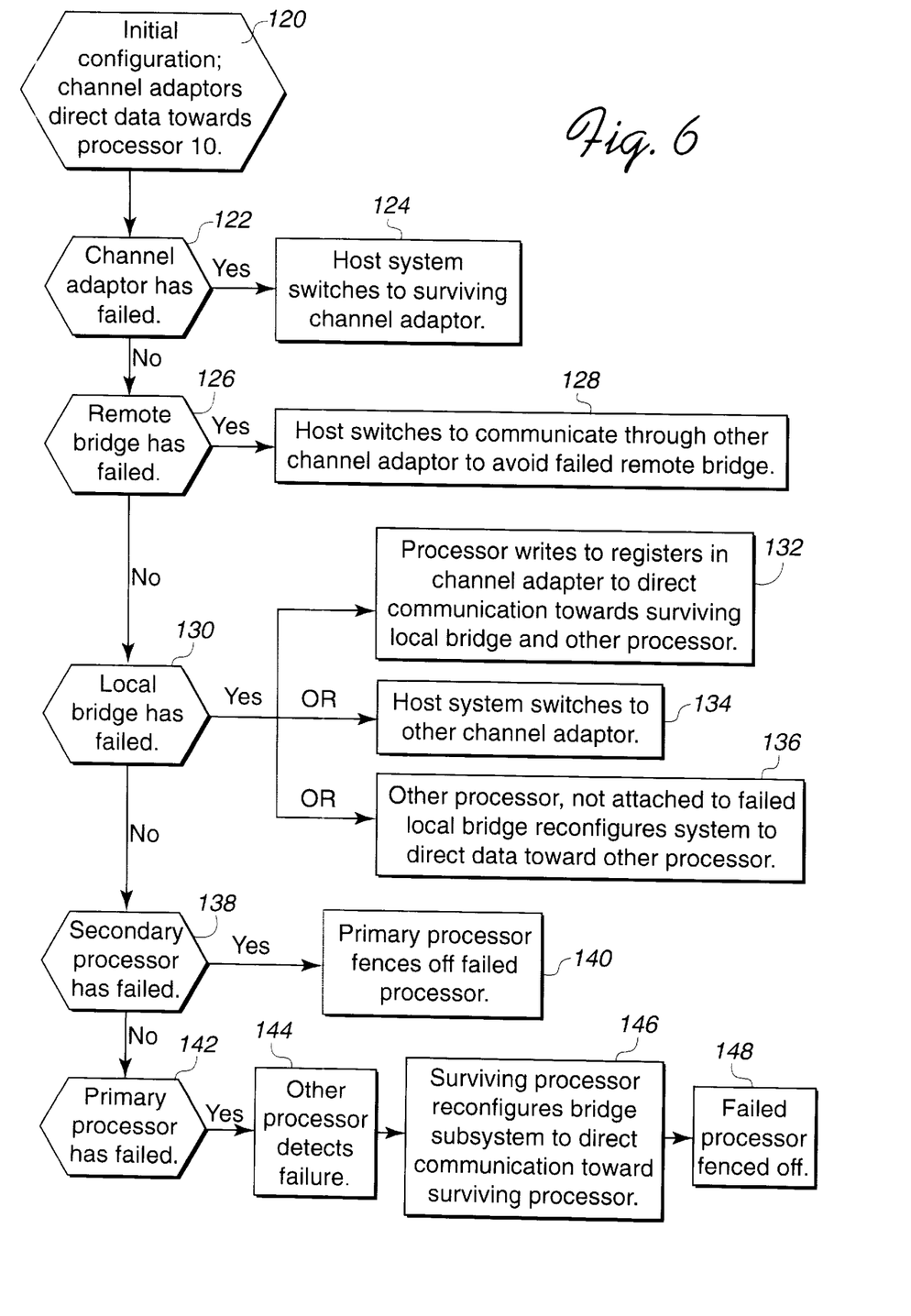
FIG. 6 is a flowchart that illustrates general logic used to handle a failure of a component within the bridge and failover subsystems in accordance with a preferred embodiment of the present invention.

FIGS. 4, 5, and 6 are flowcharts illustrating the logic used to configure the failover 2 and bridge 8 subsystems and control failover in particular situations. The logic of FIGS. 4, 5, and 6 may be implemented in a BIOS, system software, device driver programs, firmware and hardware logic (e.g., circuits and gates) implemented in processors 10, 12 or some combination thereof. Those skilled in the art will recognize that this logic is provided for illustrative purposes only and that different logic and devices may be used to accomplish the same results.

FIG. 4 is a flowchart illustrating the steps to configure the failover 2 and bridge 8 subsystems when all components are functioning. Block 92 is a block representing the failover subsystem 2 waiting for system initialization to begin and execution of the BIOS program. Control proceeds to block 94 which represents the BIOS program causing each processor 10, 12 to issue type 0 type configuration commands to configure the local PCI bridges in the attached local bridges 22, 24, 26, 28 as adaptors. Control then proceeds to block 96 which represents the BIOS program ending and the processors 10, 12 executing a device driver program to configure the remaining components in the failover 2 and bridge 8 subsystems.

Control proceeds to block 98 which represents the processors 10, 12 operating under control of the device driver program, issuing memory and I/O operation commands to configure the downstream components through remote PCI bridges 50, 52, respectively. The processors 10, 12 would transmit the configuration signals through the local 62, 64 and remote 58, 60 distance interfaces to configure the different components on its side of the bridge subsystem 8. The processors 10, 12 perform the configuration by writing to registers in the downstream components. Control then transfers to block 100 which represents processor 10 signaling the remote PCI bridge 50 to cause the remote PCI bridge 50 to configure the remote PCI bus 44 and the channel adaptors 14A, B, C, D. In alternative embodiments, processor 12 could signal remote PCI bridge 52 to configure the remote PCI bus 44 and channel adaptors 14A, B, C, D. Control then proceeds to block 102 which represents each processor 10, 12 configuring a portion of the remote bus manager 46.

After this configuration at block 104, in preferred embodiments, an initial data path is set to direct communication from channel adaptors 14, 16 to processor 10. In alternative embodiments, other data paths could be set. For instance, communication from channel adaptors 14 could be directed toward processor 10 and communications from channel adaptors 16 could be directed toward processor 12. In preferred embodiments, the host system 4 determines which channel adaptor 14, 16 is used to communicate with the device 6 below. Moreover, if dynamic channel adaptors are used, the channel adaptor could select the appropriate processor to communicate with, dependent on the configuration information provided by the processors and the device to which the communication is directed.

In preferred embodiments, after the processors 10, 12, operating under control of the device driver program, configure the components of the subsystem 8, the system functions as a PCI-to-PCI bridge system.

FIG. 5 is a flowchart illustrating how processor 12 reconfigures the bridge 8 subsystem after the occurrence of an event. The triggering event in FIG. 5 at block 106 is the processor 12 detecting the failure of processor 10 via the interface 30. This failure could be detected when processor 10 attempts to configure the failover subsystem 2 or at any time after configuration. Alternatively, the processor 12 could reconfigure the bridge subsystem 8 in other instances, such as the failure of a component in the data path between the host system 4 and processor 10. At block 108, the surviving processor 12 runs the BIOS program to reconfigure the bridge subsystem 8. Control proceeds to block 110 which represents the processor 12 issuing a type 0 type configuration command to configure the local PCI bridges in local bridges 26, 28 as adaptors. Control then proceeds to block 112 which represents the termination of the BIOS routine and the processor 12 executing the device driver program to complete the configuration.

Under control of the device driver program, control proceeds to block 114 which represents the processor 12 configuring the components within the bridge subsystem 8 directly. Control then proceeds to block 116 which represents the surviving processor 12 signaling the remote PCI bridge 52 to issue PCI configuration commands to configure the remote PCI bus 44 and the channel adaptors 14A, B, C, D. Control then transfers to block 118 which represents the processor 12 fencing off processor 10. As discussed, to fence off the failed processor 10, processor 12 could configure every device attached to the bridge subsystem 8 to set a mask bit in the addresses generated to direct data toward processor 12.

FIG. 6 is a flowchart illustrating logic to handle failures within the bridge 8 and failover 2 subsystems. Logic begins at block 120 which represents the initial configuration. In preferred embodiments, the initial configuration would have channel adaptors 14, 16 direct communication toward processor 10 via remote bridges 18, 20. As discussed, in alternative embodiments, in the initial configuration, processor 10 could handle communication for channel adaptors 14 and processor 12 could handle channel adaptors 16. Block 122 represents the state where a channel adaptor 14, 16 has failed. In such case, control transfers to block 124 which represents the attached host system 4 selecting the surviving channel adaptor 14, 16 to use for communication with the device 6. Block 126 represents the state where a component within a remote bridge 18, 20 has failed. In such case, control transfers to block 128 which represents the host system 4 selecting the channel adaptor 14, 16 connected to the surviving remote bridge 18, 20. In preferred embodiments, the host system 4 is capable of detecting failure at blocks 122, 126 and selecting the surviving channel adaptor 14, 16 to communicate with the device 6.

Block 130 represents the state where a component within a local bridge 22, 24, 26, 28 has failed. In such case, there are three possible failover options 132, 134, 136. Option 132 represents processor 10 writing to registers in the channel adaptor 14, 16 linked to the failed local bridge 22, 24, 26, 28 to cause the channel adaptor to communicate via a surviving local bridge. Yet further, with reference to FIG. 1, if local bridge 22 failed, then the processor 10 could signal remote bridge 18 to direct and map communications towards the surviving local bridge 26 and processor 12. Alternatively, at block 134, the host system 4 may select the other channel adaptor 16 to communicate with the device via processor 12 to avoid communication with the failed local bridge 22. Still alternatively, at block 136, upon failure of the local bridge 22 used in the initial configuration, the processor 12 could reconfigure the bridge subsystem 8 to direct communication toward processor 12.

Block 138 represents the state where the secondary processor 12 has failed. The secondary processor 12 did not initially configure the failover subsystem 2. If any data paths from the host system 4 were directed toward failed processor 12 as a result of the initial configuration, then control transfers to block 140 which represents processor 10 fencing off all paths to processor 12 and configuring channel adaptors 14, 16 to communicate with processor 10 exclusively via remote bridge 18 and/or 20.

Block 142 represents the state where the primary processor 10 has failed. In such case control transfers to block 144 which represents processor 12 detecting the failure via the interface 30. Control transfers to block 146 which represents processor 12 reconfiguring the bridge subsystem 8 to direct communication toward processor 12 in the manner discussed above and with respect to FIG. 4. As a result of this reconfiguration, at block 148, processor 10 is fenced off.

In embodiments where dynamic channel adaptors are used, the dynamic channel adaptors can detect a failure within the bridge subsystem 8. In such case, the channel adaptor would communicate such failure to the processors 10, 12. The processors 10, 12 would then determine the functioning data paths to utilize to avoid the failed component and communicate the functioning data paths to the dynamic channel adaptors. The dynamic channel adaptors could then select a functioning data path to use dependent on the device to which the communication is directed.

Conclusion

This concludes the description of the preferred embodiments of the invention. The following describes some alternative embodiments for accomplishing the present invention.

In the discussed preferred embodiments, initial configurations and steps to configure the components within the bridge subsystem 8 are described. Those skilled in the art will appreciate that alternative steps could be taken to configure the components within the bridge subsystem 8. Preferred embodiments further describe initial data paths set after configuration and reconfiguration by a surviving processor. In alternative embodiments, there are other combinations of data paths that could be selected during the initial configuration or reconfiguration to direct data from the host system 4 to the device 6.

In the preferred embodiments, the devices attached to the bridge subsystem 8 that communicate with the processors 10, 12 are channel adaptors. However, in alternative embodiments devices other than channel adaptors may be linked to the bridge subsystem 8 to communicate with the processors 10, 12. In still further embodiments, additional devices may be added to the bridge subsystem 8. Additional devices may be attached to a remote bridge 18, 20.

Alternatively, the bridge subsystem 8 could include additional remote and local bridges to provide communication between the additional devices and/or processors 10, 12. For instance, additional processors may be added as bus masters to the bridge subsystem 8. In such case, additional local bridges would be added to the bridge subsystem to link the additional processor bus master to the remote bridges 18, 20 and attached devices, e.g., channel adaptors 14, 16. If an additional device is added, then an additional remote bridge and local bridges may be added to provide an additional data path from the added device to the processors. In still further embodiments, both additional processors and remote bridges may be added.

The preferred bridge subsystem 8 embodiment utilizes the PCI to PCI bridge architecture. However, in alternative embodiments technology different from the PCI bridge architecture may be used to implement the bridge subsystem 8. The bridge components within the bridge subsystem 8 may communicate via local busses that interconnect the bridge components and function as primary and secondary interfaces.

In preferred embodiments, during configuration and reconfiguration, the processors 10, 12 execute commands and signals to the components of the bridge subsystem 8 to carry out the configuration. In alternative embodiments, additional processors and devices could be provided to carry out certain of the configuration operations carried out by the processors 10, 12 in the preferred embodiments discussed above.

In summary, preferred embodiments in accordance with the present invention provide a system for communication among a device, a first processor, and a second processor. One of a first data path and second data path is configured. The first data path comprises a bus, a first remote bridge, and a first local bridge. After configuring the first data path, the device communicates to the first processor by communicating data through the local bus to the first remote bridge. The first remote bridge transmits the data to the first local bridge and the first local bridge transmits the data to the first processor. The second data path comprises the bus, a second remote bridge, and a second local bridge. After configuring the second data path, the device communicates to the second processor by communicating data through the bus to the second remote bridge. The second remote bridge transmits the data to the second local bridge and the second local bridge transmits the data to the second processor.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for communication among a device, a first processor, and a second processor, comprising:

configuring with the first processor a first data path and configuring with the second processor a second data path, wherein both the first and second processors issue initial configuration commands and both are capable of separately configuring both the first and second data paths;

wherein the first data path comprises a bus, a first remote bridge, and a first local bridge, wherein after configuring the first data path, the device communicates to the first processor by communicating data through the bus to the first remote bridge, wherein the first remote bridge transmits the data to the first local bridge, and wherein the first local bridge transmits the data to the first processor; and wherein the second data path comprises the bus, a second remote bridge, and a second local bridge, wherein after configuring the second data path, the device communicates to the second processor by communicating data through the bus to the second remote bridge, wherein the second remote bridge transmits the data to the second local bridge, and wherein the second local bridge transmits the data to the second processor.

2. The method of claim 1, wherein the local and remote bridges are configured to function as PCI agents.

3. The method of claim 1, wherein the device is in communication with a third processor, wherein the step of configuring includes the step of configuring one of a first data path, second data path, and a third data path, wherein the third data path comprises the bus, the first remote bridge, and a third local bridge, wherein after configuring the third data path, the device communicates to the third processor by communicating data through the bus to the first remote bridge, wherein the first remote bridge transmits the data to the third local bridge, and wherein the third local bridge transmits the data to the third processor.

4. A method for communication among a device, a first processor, and a second processor, comprising:

configuring with the first processor a first data path comprising a bus, a first remote bridge, and a first local bridge by:

(i) configuring with the first processor the first local bridge as a device;

(ii) issuing a configuration signal with the first processor to configure the first remote bridge;

(iii) issuing configuration signals with the first processor to configure the bus and the device connected thereto;

wherein after configuring the first data path, the device communicates to the first processor by communicating data through the bus to the first remote bridge, wherein the first remote bridge transmits the data to the first local bridge, and wherein the first local bridge transmits the data to the first processor, wherein the first processor configures the first data path;

configuring with the second processor the second data path comprising the bus, a second remote bridge, and a second local bridge, by:

(i) configuring with the second processor the second local bridge as a device; and (ii) issuing a configuration signal with the second processor to configure the second remote bridge;

wherein after configuring the second data path, the device communicates to the second processor by communicating data through the bus to the second remote bridge, wherein the second remote bridge transmits the data to the second local bridge, and wherein the second local bridge transmits the data to the second processor.

5. The method of claim 4, wherein the steps of configuring the first and second local bridges by the first and second processors occurs during execution of a BIOS program and further including the step of the first and second processors executing a device driver program to issue the configuration signals.

6. The method of claim 4, further including the step of reconfiguring with the second processor the first and second data paths by issuing a signal with the second processor to the device to communicate with the second processor via the second remote bridge and the second local bridge.

7. The method of claim 6, further including the step of detecting with the second processor a failure of the first processor, wherein the step of reconfiguring the first and second data paths occurs after detecting the failure of the first processor.

8. A method for communication among devices, a first processor, and a second processor, comprising:
configuring one of a first data path and second data path;
wherein the first data path comprises a bus, a first remote bridge, and a first local bride, wherein after configuring the first data path, a first device communicates to the first processor by communicating data through the bus to the first remote bridge, wherein the first remote bridge transmits the data to the first local bridge, and wherein the first local bridge transmits the data to the first processor; and
wherein the second data path comprises the bus, a second remote bridge, and a second local bridge, wherein after configuring the second data path, the first device communicates to the second processor by communicating data through the bus to the second remote bridge, wherein the second remote bridge transmits the data to the second local bridge, and wherein the second local bridge transmits the data to the second processor;
configuring one of a third data path and a fourth data path for each additional device communicating with the first and second processors;
wherein the third data path comprises an additional bus, a third remote bridge, and a third local bridge, wherein after configuring the third data path, the additional device communicates to the first processor by communicating data through the additional bus to the third remote bridge, wherein the third remote bridge transmits the data to the third local bridge, and wherein the third local bridge transmits the data to the first processor; and
wherein the fourth data path comprises the additional bus, a fourth remote bridge, and a fourth local bridge, wherein after configuring the fourth data path, the additional device communicates to the second processor by communicating data through the additional bus to the fourth remote bridge, wherein the fourth remote bridge transmits the data to the fourth local bridge, and wherein the fourth local bridge transmits the data to the second processor.

9. The method of claim 8, wherein the first processor configures at least one of the first, second, third, and fourth data paths to communicate with the first processor.

10. The method of claim 9, wherein the second processor configures at least one of the first, second, third, and fourth data paths to communicate with the second processor.

11. A bridge subsystem providing communication among a device, a first processor, and a second processor, comprising:
(a) a first data path, comprising:
(i) a bus;
(ii) a first remote bridge; and
(iii) a first local bridge, wherein the device is capable of communicating with the first processor by communicating data through the bus to the first remote bridge, wherein the first remote bridge transmits the data to the first local bridge, and wherein the first local bridge transmits the data to the first processor;
(b) a second data path, comprising:
(i) the bus;
(ii) a second remote bridge; and
(iii) a second local bridge, wherein the device is capable of communicating with the second processor by communicating data through the bus to the second remote bridge, wherein the second remote bridge transmits the data to the second local bridge, and wherein the second local bridge transmits the data to the second processor;
(c) means for configuring the first local bridge as a device;
(d) means for configuring the second local bridge as a device;
(e) means for configuring the first remote bridge; and
(f) means for configuring the bus and the device connected thereto.

12. The bridge subsystem of claim 11, wherein the first and second processors include means for executing a device driver program to perform configuration operations.

13. The bridge subsystem of claim 11, further including means, performed by the second processor, for issuing a signal to the device to communicate with the second processor via the second remote bridge and the second local bridge.

14. The bridge subsystem of claim 13, further including means for detecting a failure of the first processor, wherein the second processor reconfigures the first and second data paths after detecting the failure of the first processor.

15. The bridge subsystem of claim 11, wherein the local and remote bridges are configured to function as PCI agents.

16. The bridge subsystem of claim 11, further including:
a third processor; and
a third data path comprising the bus, the first remote bridge, and a third local bridge, wherein the device is capable of communicating with the third processor the bus to the first remote bridge, wherein the first remote bridge transmits the data to the third local bridge, and wherein the third local bridge transmits the data to the third processor.

17. A bridge subsystem providing communication among a first and second device, a first processor, and a second processor, comprising:
(a) a first data path, comprising:
(i) a bus;
(ii) a first remote bridge; and
(iii) a first local bridge, wherein the first device is capable of communicating with the first processor by communicating data through the bus to the first remote bridge, wherein the first remote bridge transmits the data to the first local bridge, and wherein the first local bridge transmits the data to the first processor;

(b) a second data path, comprising:
  (i) the bus;
  (ii) a second remote bridge; and
  (iii) a second local bridge, wherein the first device is capable of communicating with the second processor by communicating data through the bus to the second remote bridge, wherein the second remote bridge transmits the data to the second local bridge, and wherein the second local bridge transmits the data to the second processor;
(c) a third data path, comprising:
  (i) a second bus;
  (ii) a third remote bridge; and
  (iii) a third local bridge, wherein the second device is capable of communicating with the first processor by communicating data through the second bus to the third remote bridge, wherein the third remote bridge transmits the data to the third local bridge, and wherein the third local bridge transmits the data to the first processor; and
(d) a fourth data path, comprising:
  (i) the second bus;
  (ii) a fourth remote bridge; and
  (iii) a fourth local bridge, wherein the second device is capable of communicating with the second processor by communicating data through the second bus to the fourth remote bridge, wherein the fourth remote bridge transmits the data to the fourth local bridge, and wherein the fourth bridge transmits the data to the second processor.

18. The bridge subsystem of claim 17, wherein the first processor configures at least one of the first, second, third, and fourth data paths to communicate with the first processor.

19. The bridge subsystem of claim 18, wherein the second processor configures at least one of the first, second, third, and fourth data paths to communicate with the second processor.

20. A method for transmitting data through a bridge subsystem, comprising the steps of:
  transmitting data from a first device to a remote bridge;
  transmitting the data from the remote bridge to a first local bridge and a copy of the data toward a second local bridge;
  transmitting the data from the first local bridge to a processor;
  transmitting the copy of the data from the second local bridge to a non-volatile storage unit for storage therein; and
  transmitting the data from the processor to a second device.

21. The method of claim 20, further including the steps of:
  detecting a failure that prevents the processor from transmitting the data to the second device;
  transmitting the data from the non-volatile storage unit to an additional processor after detecting the failure; and
  transmitting the data from the additional processor to the second device.

22. The method of claim 20, wherein the first device is a channel adaptor connected to a host system and the second device is a storage system.

23. A method for transmitting data through a bridge subsystem, comprising:
  transmitting data from a first device to a remote bridge;
  transmitting the data from the remote bridge to a first local bridge and a copy of the data toward a second local bridge;
  transmitting the data from the first local bridge to a first processor;
  transmitting the copy of the data from the second local bridge to a non-volatile storage unit for storage therein;
  transmitting the data from the first processor to a second device;
  transmitting data from a third device to a second remote bridge;
  transmitting the data from the second remote bridge to a third local bridge and a copy of the data to a fourth local bridge;
  transmitting the data from the third local bridge to a second processor;
  transmitting the copy of the data from the fourth local bridge to an additional non-volatile storage unit for storage therein; and
  transmitting the data from the second processor to the second device.

24. The method of claim 23, further including the steps of:
  detecting a failure that prevents the additional processor from transmitting the data to the second device;
  transmitting the copy of the data stored in the additional non-volatile storage unit to the processor after detecting the failure; and
  transmitting the copy of the data from the processor to the second device.

25. The method of claim 23, wherein the third device is a channel adaptor and the second device is a storage system.

26. A bridge subsystem, comprising:
  (a) a first device;
  (b) a remote bridge linked to the first device;
  (c) a first local bridge linked to the remote bridge;
  (d) a second local bridge linked to the remote bridge;
  (e) a processor linked to the first local bridge, wherein data is directed from the first device to the processor via the remote bridge and the first local bridge;
  (f) a non-volatile memory unit linked to the second local bridge, wherein a copy of the data is directed from the remote bridge to the non-volatile memory unit via the second local bridge; and
  (g) a second device linked to the processor, wherein the processor transmits data to the second device.

27. The bridge subsystem of claim 26, further including:
  means for detecting a failure that prevents the processor from transmitting the data to the second device; and
  an additional processor, wherein the non-volatile storage unit transmits the copy of the data to the additional processor after detecting the failure, and wherein the additional processor transmits the copy of the data to the second device.

28. The bridge subsystem of claim 26, wherein the first device is a channel adaptor connected to a host system and the second device is a storage system.

29. A bridge subsystem, comprising:
  a first device;
  a first remote bridge linked to the first device;
  a first local bridge linked to the remote bridge;
  a second local bridge linked to the first remote bridge;
  a first processor linked to the first local bridge, wherein data is directed from the first device to the first processor via the first remote bridge and the first local bridge;
  a first non-volatile memory unit linked to the second local bridge, wherein a copy of the data is directed from the first remote bridge to the first non-volatile memory unit via the second local bridge;

a second device linked to the first processor, wherein the first processor transmits data to the second device;

a third device;

a second remote bridge;

a third local bridge linked to the second remote bridge;

a fourth local bridge linked to the second remote bridge;

a second processor linked to the third local bridge, wherein data is directed from the third device to the second processor via the second remote bridge and the third local bridge, wherein the second processor transmits the data to the second storage device; and a second non-volatile memory unit linked to the fourth local bridge and the second processor, wherein a copy of the data is directed from the second remote bridge to the second non-volatile memory unit via the fourth local bridge.

30. The bridge subsystem of claim 29, further including means for detecting a failure that prevents the additional processor from transmitting all the data to the second device, wherein the additional non-volatile storage unit transmits the copy of the data to the processor after detecting the failure, and wherein the processor transmits the copy of the data to the second device.

31. The bridge subsystem of claim 29, wherein the third device is a channel adaptor.

* * * * *